(12) United States Patent
Tsau

(10) Patent No.: US 7,940,170 B2
(45) Date of Patent: May 10, 2011

(54) TRACKING SYSTEM WITH USER-DEFINABLE PRIVATE ID FOR IMPROVED PRIVACY PROTECTION

(75) Inventor: Guannho George Tsau, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 369 days.

(21) Appl. No.: 12/042,718

(22) Filed: Mar. 5, 2008

(65) Prior Publication Data

US 2009/0224970 A1 Sep. 10, 2009

(51) Int. Cl.
*G08B 1/08* (2006.01)
*G08B 5/22* (2006.01)

(52) U.S. Cl. .............................. 340/539.13; 340/825.49

(58) Field of Classification Search ............. 340/539.19, 340/572.4

See application file for complete search history.

(56) References Cited

U.S. PATENT DOCUMENTS

| | | | |
|---|---|---|---|
| 6,525,768 B2 * | 2/2003 | Obradovich | 348/231.99 |
| 6,812,824 B1 * | 11/2004 | Goldinger et al. | 340/10.1 |
| 7,176,801 B2 * | 2/2007 | Matsukawa et al. | 340/572.5 |
| 2002/0121975 A1 * | 9/2002 | Struble et al. | 340/571 |
| 2006/0103551 A1 * | 5/2006 | Weng et al. | 340/988 |
| 2006/0238334 A1 | 10/2006 | Mangan et al. | |
| 2007/0008070 A1 * | 1/2007 | Friedrich | 340/10.1 |
| 2007/0264974 A1 | 11/2007 | Frank et al. | |

FOREIGN PATENT DOCUMENTS

WO WO 03/036322 A2 1/2003

* cited by examiner

*Primary Examiner* — Daniel Wu
*Assistant Examiner* — Pameshanand Mahase
(74) *Attorney, Agent, or Firm* — Lathrop & Gage LLP

(57) ABSTRACT

A location tracking service includes a location tracking server and individual tracking modules. An individual tracking module can be attached or embedded in a consumer product. Each tracking module is programmable by an end-user to include a private ID that is sent along with tracking data to the location tracking server. The end-user can define and edit the private ID in the tracking module independent of the location tracking service to improve privacy protection. The tracking data may include raw (unprocessed) location data to reduce processing requirements at the tracking module.

21 Claims, 4 Drawing Sheets

TRACKING SYSTEM WITH USER-DEFINABLE PRIVATE ID FOR IMPROVED PRIVACY PROTECTION

FIELD OF THE INVENTION

The present invention is generally related to techniques to track objects using a source of location signals. More particularly, the present invention is directed to providing improved privacy protection when objects are tracked.

BACKGROUND OF THE INVENTION

The Global Positioning System (GPS) permits absolute location to be calculated quickly and accurately. In recent years the cost of GPS tracking tags has dropped significantly. There is increasing interest in using the Global Positioning System (GPS) to track the movement of goods. For example, some shipping companies use GPS tracking tags to track the shipment of goods.

There are, however, several problems with GPS that have limited its use in consumer goods. One issue is cost. While the cost of GPU tracking tags is decreasing with time it is sill more expensive than desired, particularly when all of the associated costs to accurately track a consumer good during its entire lifetime are taken into account.

Another issue that limits the use of GPS tracking in consumer goods is associated with privacy concerns. Consumers have become increasingly aware that personal information stored on servers can sometimes be compromised through security breaches and/or unauthorized sharing. GPS tracking of consumer goods exposes consumers to the risk that third parties may hack into tracking servers and become aware of the personal habits and current location of the consumer and of the consumer's goods. Thus, consumers have legitimate concerns that the GPS tracking of consumer goods may increase their risk of being victimized by malicious third parties attempting to use purloined GPS tracking data to commit fraud or robbery. Additionally, some consumers are concerned about unwelcome attention from advertisers that might try to exploit GPS tracking data to bombard the consumer with targeted advertisements. Moreover, some consumers have a general concern that the government may misuse GPS tracking information.

Therefore in light of the above-described problems with conventional location tracking techniques a new tracking apparatus, system, and method is desired to reduce tracking costs and improve consumer privacy.

SUMMARY OF THE INVENTION

A location tracking service includes features to improve privacy protection. An individual tracking module is attached or embedded in something that an end-user desires to be tracked. An individual tracking module has a private ID stored in a local memory of the tracking module. A user responsible for the tracking module can independently define and edit the private ID stored in the tracking module. The private ID is sent along with tracking data to a location tracking server. In one embodiment, additional privacy preferences may also be programmed by the user and sent along with the tracking data. An end-user is not required to provide a public ID to the location tracking server until they make an initial service request.

One embodiment of a method of providing tracking information with privacy protection includes receiving in a tracking module a private ID defined by a user. The private ID is stored in a memory of the tracking module. In response to a trigger, the tracking module sends an instance of location tracking data to a location tracking server. The location tracking data includes a representation of the private ID defined by the user. The tracking module sends each instance of tracking data with the private ID defined by the user and without a public ID identifying the user. Consequently, the identity of the user is unknown at the location tracking server until the user makes an initial service request providing the private ID and a public ID.

One embodiment of an apparatus includes a tracking module. The tracking module is operable to receive location signals. The tracking module transmits an instance of tracking data to a location tracking server in response to a trigger. A memory is coupled to the tracking module. A user interface is provided for a user to program a private ID into a memory independently of the location tracking server. The private ID is independently definable and editable by the user. The tracking module sends each instance of tracking data with the private ID. The identity of the an end-user is unknown at the location tracking server until the end-user makes an initial service request providing the private ID and a public ID.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
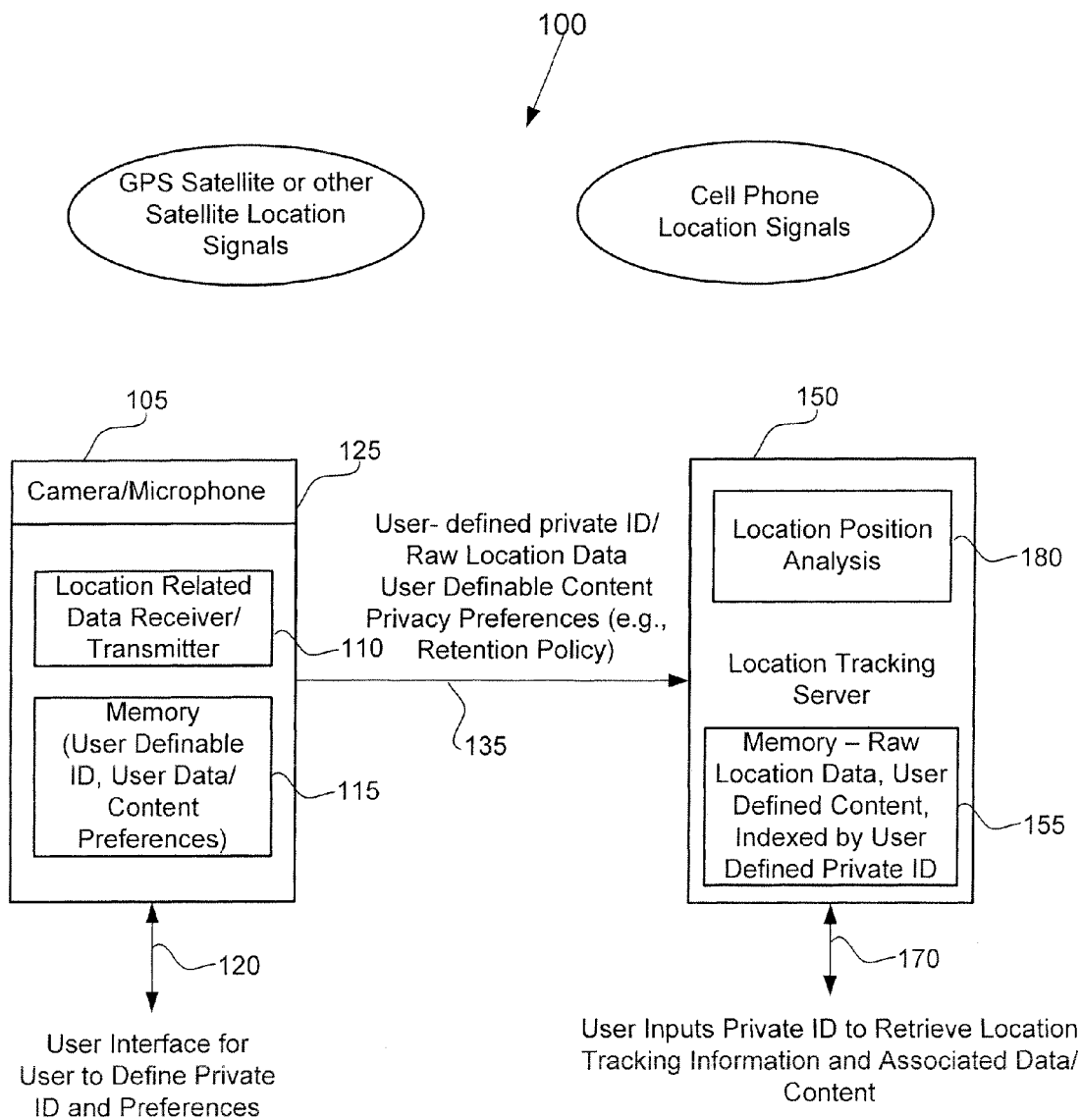
FIG. 1 is a block diagram of a tracking system with improved privacy protection in accordance with one embodiment of the present invention.

FIG. 1 illustrates a location tracking system 100 in accordance with one embodiment of the present invention. A tracking module 105 may be embedded or attached to something that a consumer would desire to be tracked, such as an expensive consumer product that could become lost or stolen during the lifetime of the consumer product. Tracking module 105 includes a receiver/transmitter unit 110. Receiver/transmitter unit 110 receives location related data signals from a source of location signals. Receiver/transmitter unit 110 is further capable of transmitting location information to location tracking server 150, preferably using a wireless communication technique (e.g., cell phone, WiFi, WiMax).

In one implementation the location signals are satellite location signals, such as raw (unprocessed) Global Positioning System (GPS) data signals from a set of satellites that may be further processed to determine an accurate position location. While GPS is one example, other satellite based location systems are being developed around the world such as the Russian GLONASS system, the European Galileo positioning system, and similar systems that have been proposed in China and India. In these satellite based positioning systems a receiver receives signals from a set of satellites (e.g., four or more satellite signals for GPS). The raw data from a satellite includes a current (satellite) time at the time of transmission and parameters to calculate the location of the GPS tracking receiver. The raw satellite data from four satellites permits the position of an object to be accurately determined.

Tracking module 105 include a local memory 115 into which an end-user may use a user interface 120 to program a user-defined private identification (ID) and preferably user-defined preferences (e.g., to define trigger states that determine conditions for which individual instances of tracking data are received and/or sent and to also define other user preferences). Additionally, a local source 125 of user content/data may be included, such as a microphone and/or a camera. Depending on user preferences and triggering states, the private ID, location data, and user definable content are sent as tracking data 135 to location tracking server 150. Additionally, in one embodiment privacy preferences, such as a retention policy, may be sent to server 150. A product ID may also be stored in memory 115 by a manufacturer and sent along with the private ID. For example, the product ID may be an identifier indicating a product make or model number. The local memory 115 may, for example, be implemented as an EEPROM or other memory that retains data in the absence of power.

Note however that tracking module 105 does not send a public ID that would link the end-user with the private ID. For example, the transmitted instances of tracking data 135 would preferably not include an email address, phone, fax, or name of the end-user. Consequently, even though location tracking server 150 receives instances of tracking data that include a private ID, that information is insufficient, by itself, to reveal the identity of the end-user. Consequently, an end-user can remain completely anonymous until the time that they need to make a service request to location tracking server 150. As described below in more detail, the capability of a user to change their private ID also provides an end-user with a capability to recover their anonymity for future service requests. As will be described in more detail, user trigger preferences and user retention preferences provide an additional layer of end-user privacy protection.

Tracking module 105 may be pre-programmed to send data to only one pre-defined location tracking server 150. However, more generally alternate implementations include a capability for the consumer to select a particular location tracking server (e.g., through a user interface menu or via a user input to define a data path).

In one implementation tracking module 105 receives only raw (unprocessed) location tracking signals and does not compute the location to reduce the power consumption, processing requirements, and cost of tracking module 105. In this embodiment only a version of the raw (unprocessed) location tracking signals is included in the location tracking data (e.g., a version of raw unprocessed GPS data signals) sent from tracking module 105 to location tracking server 150. It will be understood, however, that the raw location tracking signal data may be beneficially compressed or converted into a more convenient format before being sent by tracking module 105 to location tracking server 150.

Location tracking server 150 receives instances of tracking data sent by tracking module 105. In a practical system location tracking server 150 would store data sent by a multitude of different tracking modules 105 in a database memory 155, which indexes raw location data and user defined content according to received private IDs. In one embodiment the location tracking server 150 does not require an end-user to pre-register with the location tracking server 150. In other words, the end-user makes their own selection of a private ID independently of location tracking server 150 without having to register the private ID with the location tracking server 150 or otherwise provide information directly to location tracking server 150 identifying the end-user.

To service a request from a particular end-user requires receiving the private ID (to perform a database lookup) and also sufficient addressing information to respond back to the end-user with requested information, which can be described as a public ID. The public ID could include information to directly identify an end-user and therefore send requested information to them, such as a name, phone/FAX number, postal address, and/or email address sent with a service request. Alternately, a public ID could include lookup information sufficient for the location tracking server 150 to indirectly provide a requested service to an end-user, such as via a user name or a data pathway through an intermediary service.

In one usage scenario the end-user can define their own private ID at any time and/or change it at any time. Moreover, the end-user only needs to provide a public ID when they require tracking information. Thus, as indicated by arrow 170, the end-user inputs their private ID (e.g., by phone, FAX, or email, which inherently includes a public ID) when they want location tracking information. The private ID, in turn, permits the location tracking server 150 to perform a lookup in its database.

In one implementation a location position analysis module 180 calculates position information on demand in response to the user request 170. This implementation reduces costs at the location tracking server and also further improves consumer security.

As previously described, each instance of tracking data sent by tracking module 105 does not include a public ID and the instances of tracking data stored in database 155 can only be looked up if the private ID is known. Consequently, prior to location tracking server 150 receiving an initial service request, the identity of the end-user associated with a particular tracking module will remain completely secure even if the contents of database 155 of location tracking server 150 are compromised due to the actions of malicious third party (e.g., a hacker) or a government agency.

Various measures may be used to protect the public ID after an initial service request. For example, a public ID retention policy may be implemented at location tracking server 150 to delete a public ID in response to a condition, such as a bill being paid by an end-user or specific request from an end-user. Other techniques, such as the use of an intermediary service to shield location tracking server 150 from directly receiving a public ID from an end-user (e.g., a service that receives service requests from an end-users and passes anonymous services requests on to location tracking server 150). Moreover, an end-user can redefine their private ID in tracking module 105 at any time, such as after making a service request, if they desire an additional measure of privacy protection.

Figure 2:
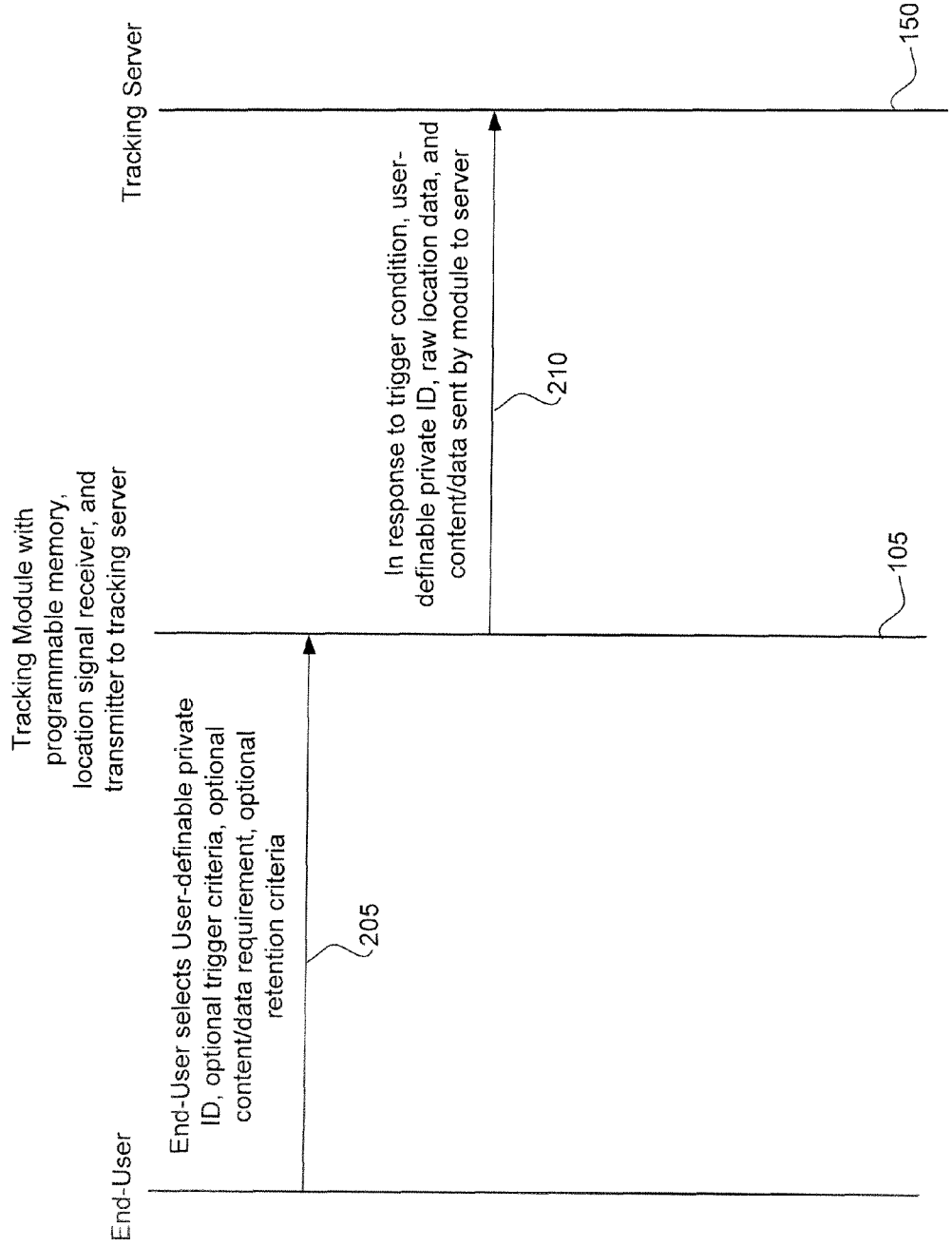
FIGS. 2-4 are interaction diagrams illustrating exemplary usage scenarios in accordance with embodiments of the present invention.

Referring to FIG. 2, in one embodiment the end-user can also improve their privacy protection by selecting appropriate triggering states for transmitting in step 210 instances of tracking data from module 105 to location tracking server 150. In one implementation tracking module 105 has default triggers for communicating with tracking server 150 such as whenever module 105 is powered on or according to a factory-set schedule (e.g., every 20 minutes). However, in one implementation the consumer selects the triggering states, as this provides an additional layer of privacy protection and/or more economical use of power. For example, a consumer may desire to enable the transmission of tracking information only during certain time periods (e.g., during a vacation), according to a consumer-selected schedule (e.g., every hour), or based on particular triggering events, such as inputs to selected buttons (e.g., an emergency button).

Another measure of privacy protection can be provided by selecting data retention criteria at location tracking server 150. For some usage scenarios it may be desirable to collect and store instances of tracking data collected for a particular private ID over a long time period (e.g., months or years). However, in other applications it may be desirable in the interests of further improving privacy protection to limit the retention of data received at location tracking server 150 to specific time periods. As one example, a retention policy could be based on typical times required for end-users to report lost or stolen goods to the police or insurance agencies (e.g., 30-90 days). As another example, the retention policy could be based on a criteria based on a payment criteria being satisfied (e.g., deleting data after some time period elapses after a bill is paid by the end-user for services rendered). In one implementation the retention policy is a factory setting in module 105 or a general policy of location tracking server 150. However, more generally some consumers may desire the capability to define their own data retention preferences regarding how long data is retained and the disposition of data after a location tracking service is rendered. As previously described, in one embodiment each instance of tracking data includes a user-defined data retention preference. Additionally data retention options may be provided when a user requests a location tracking service.

In an alternate embodiment other sources of location signals may be used instead of satellite based signals, such as cell phone location signals. However, the use of cell phone location signals has the disadvantage of requiring an additional transmitter (not shown) within unit 110 to communicate with different cell phone base stations in accordance with conventional cell phone location detection protocols. As a cell phone transmitter changes location different base station towers monitor the relative signal strength, which permits a cell phone service provider to determine the approximate location. However, the use of cell phone location signals requires that a provider of cell phone services further transmit location information back to tracking module 105 or alternatively to be affiliated with location tracking server 150 and provide location information to location tracking server 150 (e.g., with the private ID and a time stamp).

FIG. 2 is an interaction diagram in accordance with one embodiment of the present invention. One level of consumer privacy afforded by the present invention is that the end consumer can make choices regarding how location tracking data is sent to the location tracking server that are not possible in the prior art. As indicated by arrow 205, the end-user can define a private ID of their own choosing (and can preferably modify it at any time to further improve security). Assuming that the consumer does not share the private ID with others, any data sent in step 210 by module 105 to location tracking server 150 cannot be indexed to the end-user prior to an initial service request. The consumer is thus provided an additional measure of privacy protection against unauthorized third parties that might attempt to hack into location tracking server 150. As one example, the user interface of the tracking module could request the end-user to input as the private ID an alpha-numeric password which is then stored only in tracking module 105. However, the private ID does not include sufficient public information by itself to identify the end-user (personal name, personal address, email address etc.). In this example, while the data sent by the tracking module 105 includes the private ID, the private ID cannot, by itself, identify the end-consumer. Consequently, unless the consumer makes a request for tracking information (with the private ID) that includes a public ID the consumer is untrackable and remains anonymous.

Figure 3:
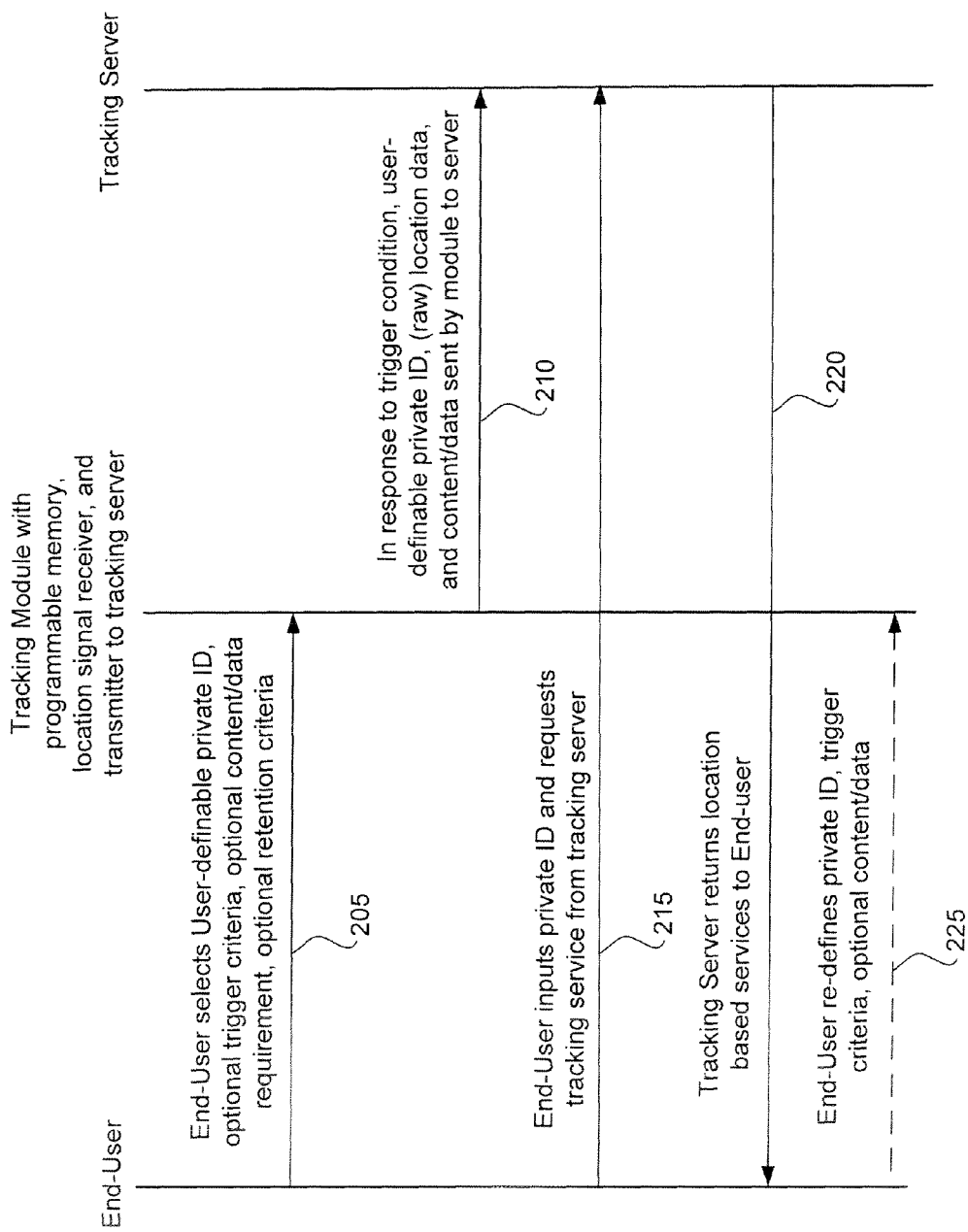

FIG. 3 is an interaction diagram including additional steps associated with an end-user requesting a tracking service from the location tracking server 150. An end-user makes a service request in step 215 for a location tracking service and provides their private ID. In one usage scenario, the end-user is also required to input some form of public ID as part of the request. For example, an email request inherently includes sending an email address; a phone request includes sending a phone number that can be determined by caller ID. For services that are billed, billing information typically includes the end-user name for billing purposes. The tracking server then returns in step 220 a location based service to the end-user to fulfill the request. Note that at this portion of the process there is privacy concern in that the location tracking server can now associate the collected data with the actual consumer via the public ID that is associated with a service request. An end-user that is concerned about privacy then has the option to re-define their private ID and other preferences as illustrated by arrow 225 in order to protect their privacy regarding future data transmission from module 105 to location tracking server 150. Additionally, in some usage examples it may be desirable to provide the end-user an option for the public ID to not be indefinitely retained.

Figure 4:
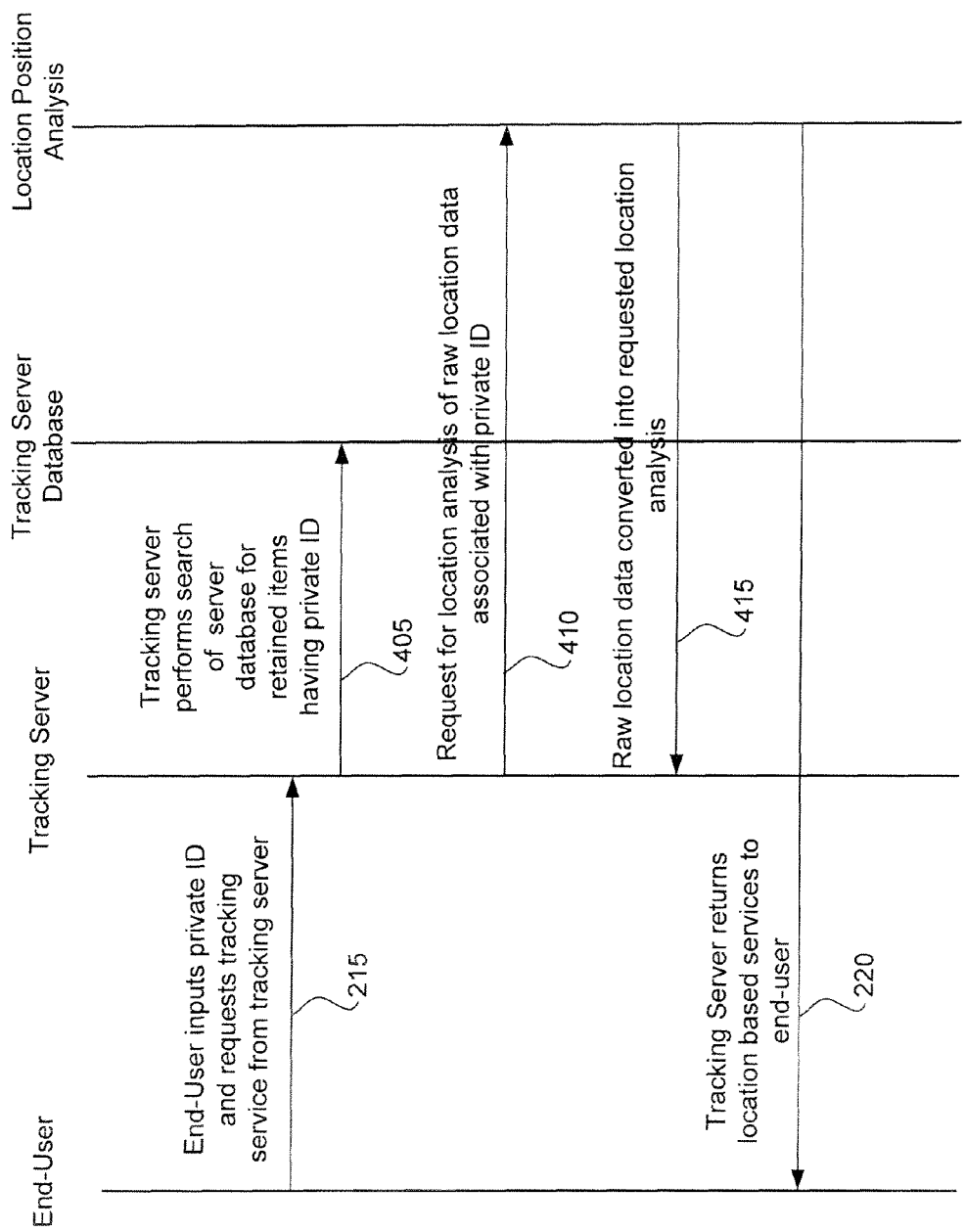

FIG. 4 illustrates in more detail an example in which location position analysis is performed on-demand, which reduces costs and further improves privacy protection. In this example, after the tracking server receives the service request in step 215 from the end-user it searches in step 405 its database for retained items having the private ID. The tracking server then makes a request in step 410 for location analysis to be performed on the raw location data associated with the private ID. The location position analysis module then converts in step 415 the raw location data into the requested location analysis (e.g., position and/or movement data). The tracking server then returns in step 220 the location based service to the end-user.

The location tracking server 150 may be maintained by different types of entities. In one implementation, location tracking server 150 is a commercial fee-based on-demand service. For example, an end-user can be charged only when they make a request for tracking services. This is in contrast to prior art GPS tracking services, which typically charge based on scheduled service fees. Thus, in addition to addressing privacy concerns, embodiments of the present invention permit an on-demand tracking model in which the end consumer is not billed unless they request a service.

As another example, an entity interested in the recovery of lost or stolen goods may maintain location tracking server 150 to aid in the recovery of lost or stolen items. As various examples, location tracking server 150 could be maintained by an insurance agency, as a warranty service offered by a goods manufacturing/sales organization, or by a law enforcement agency.

In an alternate embodiment, the location tracking server 150 is supported by an entity interested in providing consumers with the option to track movable objects. As one example, the present invention could be applied to track animals. A concerned animal protection group (e.g., the Society for Prevention of Cruelty to Animals) could host the location tracking server. Tracking module 105 would then be attached to an animal (e.g., to a dog's pet collar). This would provide the consumer with the option to request tracking information if their pet was lost. If a camera or microphone is provided in tracking module 105 this additional data content could be provided on demand to assist in locating the pet and/or to verify that the pet was being properly treated at a veterinarian or other animal care site (e.g., dog kennel, pet hotel). Other potential applications include providing the option for a consumer to obtain a life-history of their pet (e.g., photos and location tracking information taken periodically during the lifetime of their pet). As another example, for the case of animals requiring special training or care (e.g., guide dogs for the blind, horse stabling services, or the raising of organic free-range cattle), an entity could host the location tracking server to track the animal's location and record other information (e.g., photos) in case a later dispute arose over the care or training of a particular animal.

One aspect of embodiments the present invention is that privacy protection is improved even if the contents of database 155 of location tracking server 150 are compromised. For example, even if an unwelcome third party (e.g., a hacker) obtained access to database 155 of location tracking server 150 they would be unable to discern the identify of an end-user solely from the instances of tracking data stored in database memory 155. Moreover, in various embodiments a concerned consumer has options to further improve privacy protection, such as by changing their private ID; defining preferences for when instances of tracking data are sent (trigger states); and providing data retention preferences. Consequently, embodiments of the present invention address several of the privacy concerns consumers have regarding potential misuse of tracking data by malicious third parties and the potential abuse of tracking data by government agencies.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method for providing tracking information with privacy protection, comprising:
   receiving in a tracking module a private identification (ID) defined by a user and storing the private ID in a memory of the tracking module;
   providing a user interface to the tracking module for the user to edit the private ID stored in the tracking module;
   in response to a trigger, the tracking module sending an instance of location tracking data to a location tracking server configured to receive and store the instance of location tracking data, the location tracking data including a representation of the private ID defined by the user;
   receiving in the location tracking server an initial service request including the private ID and a public ID linking the private ID with the user; and
   in response to the initial service request, providing to the user location based service from at least the instance of location tracking data,
   the tracking module sending each instance of tracking data with the private ID defined by the user and without information identifying the user such that the identity of the user is unknown at the location tracking server until the user makes the initial service request providing the private ID and the public ID to the location tracking server.

2. The method of claim 1, wherein the location tracking data sent by the tracking module includes raw unprocessed location data.

3. The method of claim 2, wherein the raw unprocessed location data corresponds to unprocessed Global Positioning System (GPS) data.

4. The method of claim 1, further comprising receiving a selection of a trigger criteria from the user and in response storing a trigger criteria in the location tracking module according to a user's selection defining states for which tracking data is received and/or sent.

5. The method of claim 4, further comprising in response to the trigger criteria sending additional data or content along with the location tracking data.

6. The method of claim 5, wherein the additional data or content includes a product code.

7. The method of claim 6, wherein the additional data or content includes at least one of audio or visual data.

8. The method of claim 6, further comprising receiving a user preference defining preferences for sending additional data or content with the tracking data.

9. The method of claim 6, further comprising receiving a user preference in the tracking module defining a data retention preference and sending the retention preference with the tracking data.

10. The method of claim 1, further comprising: receiving at the tracking module an editing request by the user to edit the private ID stored in the tracking module and in response to the edit request changing the private ID.

11. A method of providing tracking information on-demand with improved privacy, comprising:
   at a location tracking server, storing instances of tracking data received from a multitude of tracking modules with each instance of tracking data including a representation of a private identification (ID) and location data sent from an individual tracking module, each private ID stored in a respective tracking module;
   in response to an initial location tracking service request that includes a particular private ID and a public ID that links the private ID with the user, searching for stored tracking data based on the particular private ID and generating location information to fulfill the location tracking service request; and wherein each private ID is independently definable and editable by end-users in charge of respective tracking modules through user interfaces to the tracking modules such that the identity of a user is unknown until the user makes an initial location tracking service request providing the private ID and the public ID that links the private ID with the user.

12. The method of claim 11, further comprising the location tracking server enacting a retention policy to delete the public ID associated with the initial location tracking service request after a predetermined condition is satisfied.

13. The method of claim 11, wherein each instance of tracking data includes raw location data and the method further comprising the location tracking server computing position data on-demand to service the initial location tracking service request.

14. The method of claim 11, further comprising each instance of tracking data including user defined preferences regarding data retention.

15. The method of claim 11, wherein each instance of tracking data includes at least one of audio or visual data, the method further comprising the location information including audio-visual content.

16. An apparatus comprising:
a tracking module operable to receive location signals and transmit an instance of tracking data to a location tracking server in response to a trigger;
a memory coupled to the tracking module; and
a user interface coupled to the tracking module for a user to program a private identification (ID) into the memory independently of the location tracking server;
the tracking module sending each instance of tracking data to the location tracking server with the private ID independently definable and editable by the user such that the identity of an end-user is unknown until the end-user makes an initial service request providing the private ID and a public ID that links the private ID with the user.

17. The apparatus of claim 16, wherein the tracking module includes a receiver to receive raw Global Positioning System (GPS) data and a transmitter to transmit tracking data to the location tracking server.

18. The apparatus of claim 17, wherein the tracking data sent by the tracking module comprises a representation of raw GPS data and the tracking module does not compute a location from the raw GPS data.

19. The apparatus of claim 16 wherein the tracking module include at least one of a camera and a microphone, wherein instances of tracking data further include audio-visual data.

20. The apparatus of claim 16, wherein each instance of tracking data further comprises a product code.

21. The apparatus of claim 16, wherein triggering criteria is selectable by an end-user.

* * * * *